United States Patent
Ohmori et al.

(10) Patent No.: US 7,629,389 B2
(45) Date of Patent: Dec. 8, 2009

(54) PRODUCTION METHOD OF ALKALINE ZIRCONIA SOL

(75) Inventors: Yutaka Ohmori, Sodegaura (JP); Hirokazu Kato, Sodegaura (JP); Kenji Yamaguchi, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 195 days.

(21) Appl. No.: 11/922,771

(22) PCT Filed: Jun. 21, 2006

(86) PCT No.: PCT/JP2006/312434

§ 371 (c)(1),
(2), (4) Date: Dec. 21, 2007

(87) PCT Pub. No.: WO2007/000926

PCT Pub. Date: Jan. 4, 2007

(65) Prior Publication Data

US 2009/0088313 A1    Apr. 2, 2009

(30) Foreign Application Priority Data

Jun. 29, 2005    (JP) .............................. 2005-190466

(51) Int. Cl.
*B01J 37/03*    (2006.01)
*B01J 37/06*    (2006.01)

(52) U.S. Cl. ......................................... 516/11; 501/104
(58) Field of Classification Search .................. 516/11; 501/104
See application file for complete search history.

(56) References Cited

U.S. PATENT DOCUMENTS

| 5,234,870 A | 8/1993 | Osaka et al. |
| 2008/0138272 A1* | 6/2008 | Ohmori et al. ............... 423/622 |

FOREIGN PATENT DOCUMENTS

| JP | A-60-176920 | 9/1985 |
| JP | A-64-083519 | 3/1989 |
| JP | A-03-174325 | 7/1991 |
| JP | A-03-218928 | 9/1991 |
| JP | A-03-232724 | 10/1991 |
| JP | A-04-240166 | 8/1992 |
| JP | 2000-126845 | * 9/2000 |

* cited by examiner

*Primary Examiner*—Ling-Siu Choi
*Assistant Examiner*—Chun-Cheng Wang
(74) *Attorney, Agent, or Firm*—Oliff & Berridge, PLC

(57) ABSTRACT

A production method of an alkaline zirconia sol including: a process (I) in which an alkaline zirconia sol (A) is mixed with a basic zirconium carbonate salt (B1), the alkaline zirconia sol (A) being obtained by: a sub-process (i) in which a zirconium salt (B2) is heated at 60 to 110° C. in an aqueous medium containing a carbonate salt of quaternary ammonium; and a sub-process (ii) in which a hydrothermal treatment is performed at 110 to 250° C. following the sub-process (i).

10 Claims, No Drawings

PRODUCTION METHOD OF ALKALINE ZIRCONIA SOL

TECHNICAL FIELD

The present invention relates to a production method of a zirconia sol and is to provide a production method of an alkaline and stable zirconia sol.

BACKGROUND ART

Known methods for obtaining a zirconia sol include: a method for heat-hydrolyzing a zirconium salt aqueous solution, a method for adding hydrogen peroxide to a zirconium salt aqueous solution and heating the resultant solution, and a method for heating zirconium hydroxide in a basic region. For example, the following methods are disclosed.

There is proposed a method for hydrolyzing a reaction product between ammonium zirconium carbonate and a chelating agent (for example, oxyphenols, amino alcohols, oxyacids, polycarboxylic acids, oxyaldehydes, amino acids, and β-diketones) (See Patent Document 1).

Also, there is proposed a production method of a basic zirconia sol including: maintaining an aqueous dispersion containing zirconium hydroxide in a heated state at 80° C. or more until the crystallinity of produced zirconia becomes 80% or more to obtain an aqueous dispersion containing crystallized zirconia; and adding thereto, a basic compound containing nitrogen (primary amine, secondary amine, or quaternary ammonium hydroxide) or a hydroxide of an alkali metal or alkaline earth metal (See Patent Document 2).

Further, there is proposed a production method of a zirconia sol including: causing a precipitate by adding a basic substance to a zirconium salt aqueous solution; adding thereto, a hydroxide of an alkaline earth metal or an aqueous solution thereof to obtain a dispersion; and heat-aging the obtained dispersion at a temperature of 90 to 200° C. (See Patent Document 3).

[Patent Document 1] JP-A 3-174325 (1991) (Claims)
[Patent Document 2] JP-A 64-083519 (1989) (Claims)
[Patent Document 3] JP-A 60-176920 (1985) (Claims)

DISCLOSURE OF THE INVENTION

Problems to be Solved by the Invention

As described above, although various production methods of zirconia sol have been developed, many of them were production methods in which a zirconium salt was hydrolyzed in an acidic region and heated, so that a disadvantage was caused wherein a reaction system became unstable depending on formed fine particles and was likely to cause a gelation.

Further, by a method in which a zirconium salt is hydrolyzed in an alkaline region using ammonium carbonate or an alkali hydroxide, although particles were formed, with time, a large amount of sediment was deposited and the reaction system became slurry, so that a disadvantage was caused wherein a completely stable sol could not be obtained.

The present invention was completed by taking the above situation in consideration and it is an object of the present invention to provide a production method of an alkaline zirconia sol having compatibility of particle properties and binding properties by subjecting a liquid medium to which a zirconium salt is added to an aging treatment, using as a raw material, a zirconia sol, preferably an alkaline zirconia sol.

Means for Solving Problems

The present invention provides the following aspects:

as a first aspect, a production method of an alkaline zirconia sol including: a process (I) in which an alkaline zirconia sol (A) is mixed with a basic zirconium carbonate salt (B1), the alkaline zirconia sol (A) being obtained by a method including: a sub-process (i) in which a zirconium salt (B2) is heated at 60 to 110° C. in an aqueous medium containing a carbonate salt of quaternary ammonium; and a sub-process (ii) in which a hydrothermal treatment is performed at 110 to 250° C. following the sub-process (i);

as a second aspect, the production method of an alkaline zirconia sol according to the first aspect including: a process (I) in which an alkaline zirconia sol (A) and a basic zirconium carbonate salt (B1) are mixed in a mass ratio (Bs/As) ranging from 0.05 to 4.0 of a mass of a solid content (Bs) of the basic zirconium carbonate salt (B1) which is converted into an amount of $ZrO_2$ to a mass of a solid content (As) of the alkaline zirconia sol (A) which is converted into an amount of $ZrO_2$; and a process (II) in which the mixture obtained in the process (I) is aged at 20 to 100° C.;

as a third aspect, the production method of an alkaline zirconia sol according to the first or second aspect, wherein the carbonate salt of quaternary ammonium is $(NR_4)_2CO_3$, $NR_4HCO_3$ or a mixture thereof (wherein, R represents a hydrocarbon group);

as a fourth aspect, the production method of an alkaline zirconia sol according to any one of the first to third aspects, wherein quaternary ammonium ion in the carbonate salt of quaternary ammonium contains a hydrocarbon group having 1 to 18 carbon atoms;

as a fifth aspect, the production method of an alkaline zirconia sol according to any one of the first to third aspects, wherein quaternary ammonium ion in the carbonate salt of quaternary ammonium contains a hydrocarbon group having 1 to 4 carbon atoms;

as a sixth aspect, the production method of an alkaline zirconia sol according to any one of the first to fifth aspects, wherein the zirconium salt (B2) is an oxyzirconium salt;

as a seventh aspect, the production method of an alkaline zirconia sol according to any one of the first to fifth aspects, wherein the zirconium salt (B2) is zirconium oxycarbonate;

as an eighth aspect, the production method of an alkaline zirconia sol according to any one of the first to seventh aspects, wherein the basic zirconium carbonate salt (B1) is ammonium zirconium carbonate;

as a ninth aspect, the production method of an alkaline zirconia sol according to any one of the second to eighth aspects, wherein the aging in the process (II) is performed by heating at 60 to 100° C.; and as a tenth aspect, the production method of an alkaline zirconia sol according to any one of the first to ninth aspects, wherein the obtained alkaline zirconia sol has pH of 8 to 12.

Effects of the Invention

The object for use in the method according to the present invention is an alkaline zirconia sol obtained by a method including: mixing an alkaline zirconia sol with a basic zirconium carbonate salt; and optionally aging the resultant liquid medium.

The object is also an alkaline zirconia sol obtained by a production method including: a process (I) in which an alkaline zirconia sol (A) and a basic zirconium carbonate salt (B1) are mixed in a mass ratio (Bs/As) ranging from 0.05 to 4.0 of a mass of a solid content (Bs) of the basic zirconium carbonate salt (B1) which is converted into an amount of $ZrO_2$ to a mass of a solid content (As) of the alkaline zirconia sol (A) which is converted into an amount of $ZrO_2$; and a process (II) in which the mixture obtained in the process (I) is aged at 20 to 100° C.

The alkaline zirconia sol (A) used as a raw material in the process (I) is converted into zirconia particles (a) having a particle diameter ranging from 20 to 300 nm in the produced alkaline zirconia sol. With respect to the basic zirconium carbonate salt (B1), a part thereof is converted into zirconia particles (b) having a particle diameter of less than 20 nm in the produced alkaline zirconia sol, and the rest thereof is bonded to or coated on particles of the alkaline zirconia sol (A) as a raw material to be converted into zirconia particles (a). Thus, as the zirconia particles in the alkaline zirconia sol obtained according to the present invention, zirconia particles (b) having a particle diameter of less than 20 nm and zirconia particles (a) having a particle diameter ranging from 20 to 300 nm coexist.

Since the alkaline zirconia sol has compatibility of particle properties and binding properties, in a cured form thereof, large particles and small particles are packed densely, so that the adhesion thereof with an adherend is high and the surface hardness thereof is also high.

As different from the above-described related arts, in the method of the present invention in which a zirconium salt is hydrolyzed in the presence of an alkaline zirconia sol, zirconia particles present initially fulfill a role of stabilization and a part of fine particles generated by a hydrolysis of the zirconium salt is adsorbed on the surfaces of the zirconia particles, so that a stable alkaline zirconia sol in which no agglomeration is caused and which has higher preservation stability in comparison with a case where only fine particles are present, can be obtained. Thus, in the obtained alkaline zirconia sol, zirconia particles (b) having a particle diameter of less than 20 nm and zirconia particles (a) having a particle diameter ranging from 20 to 300 nm coexist well-balanced, so that the obtained alkaline zirconia sol has compatibility of binding properties derived mainly from the zirconia particles (b) having a particle diameter of less than 20 nm and particle properties derived mainly from the zirconia particles (a) having a particle diameter ranging from 20 to 300 nm, and when the alkaline zirconia sol is used as a binder, high curing properties can be obtained.

From these properties, the alkaline zirconia sol obtained according to the present invention can be applied in various applications, such as a binder for molding processing of various refractories, a binder for various catalysts, an impregnation treatment, a paint for coating, as well as molding processing of an inorganic fiber such as a ceramic fiber, shaping of a mold for a precision casting, a surface treatment of a fiber and a fuel cell.

BEST MODES FOR CARRYING OUT THE INVENTION

The method of the present invention is a production method of an alkaline zirconia sol including: a process (I) in which an alkaline zirconia sol (A) is mixed with a basic zirconium carbonate salt (B1), the alkaline zirconia sol (A) being obtained by: a sub-process (i) in which a zirconium salt (B2) is heated at 60 to 110° C. in an aqueous medium containing a carbonate salt of quaternary ammonium; and a sub-process (ii) in which a hydrothermal treatment is performed at 110 to 250° C. following the sub-process (i).

Preferably, the method of the present invention is a production method of an alkaline zirconia sol including: a process (I) in which an alkaline zirconia sol (A) as a raw material and a basic zirconium carbonate salt (B1) are mixed in a mass ratio (Bs/As) ranging from 0.05 to 4.0 of a mass of a solid content (Bs) of the basic zirconium carbonate salt (B1) which is converted into an amount of $ZrO_2$ to a mass of a solid content (As) of the alkaline zirconia sol (A) which is converted into an amount of $ZrO_2$; and a process (II) in which the mixture obtained in the process (I) is aged at 20 to 100° C.

In the process (I), it is preferred that the alkaline zirconia sol (A) and the basic zirconium carbonate salt (B1) are mixed in a mass ratio (Bs/As) ranging from 0.05 to 4.0, preferably 0.2 to 2.0 of a mass of a solid content (Bs) of the basic zirconium carbonate salt (B1) which is converted into an amount of $ZrO_2$ to a mass of a solid content (As) of the alkaline zirconia sol (A) which is converted into an amount of $ZrO_2$.

By setting the above value of Bs/As to a range of 0.2 to 2.0, an alkaline zirconia sol having more improved preservation stability can be obtained.

As the alkaline zirconia sol (A) used as a raw material of the present invention, preferably an alkaline zirconia sol having pH of 8 to 12 can be used. As the alkaline zirconia sol, a known zirconia sol can be used, however, the following alkaline zirconia sol is preferably used.

The alkaline zirconia sol (A) as a raw material can be obtained, for example by a method including: a sub-process (i) in which a zirconium salt (B2) is heated at 60 to 110° C. in an aqueous medium containing a carbonate salt of quaternary ammonium; and a sub-process (ii) in which a hydrothermal treatment is performed at 110 to 250° C.

Examples of the carbonate salt of quaternary ammonium include $(NR_4)_2CO_3$ and $NR_4HCO_3$ and these compounds can be used individually or in combination thereof. Examples of the quaternary ammonium ion in the carbonate salt of quaternary ammonium include those having a hydrocarbon group with 1 to 18 carbon atoms, and examples of the hydrocarbon group include a saturated or unsaturated chain hydrocarbon group and an alicyclic or aromatic cyclic hydrocarbon group. Examples of the saturated or unsaturated chain hydrocarbon group include a methyl group, an ethyl group, a propyl group, an isopropyl group, an octyl group, a decyl group, an octadecyl group, an ethynyl group and a propenyl group. Examples of the cyclic hydrocarbon group include a phenyl group, a tolyl group, a styryl group, a benzyl group, anphtyl group, and an anthryl group. Among them, the quaternary ammonium ion is preferably a hydrocarbon group with 1 to 4 carbon atoms, such as a methyl group, an ethyl group, a propyl group, and an isopropyl group, and particularly, a tetramethyl ammonium hydrogen carbonate composed of four methyl groups can be preferably used.

When as the above carbonate salt, a carbonate salt containing ammonium ion other than a quaternary ammonium ion is used, a stable zirconia sol (A) cannot be obtained. For example, a tertiary ammonium ion such as $(CH_3)_3HN$, a secondary ammonium ion such as $(CH_3)_2H_2N$, a primary ammonium ion such as $(CH_3)H_3N$, or an ammonium ion which becomes $NH_4$ is used, a satisfactorily stable zirconia sol (A) cannot be obtained.

In the production of the alkaline zirconia sol (A) as a raw material, a carbonate salt of a quaternary ammonium is available in the form of an aqueous solution having a content of 30 to 60% by mass thereof. Particularly, an aqueous solution having a content of a carbonate salt of quaternary ammonium of 44.5% by mass which is converted into a content of quaternary ammonium hydroxide are easily commercially available. The concentration of a carbonate salt of quaternary ammonium is obtained by a method of measuring in a concentration converted into a concentration of quaternary ammonium hydroxide.

Examples of the zirconium salt (B2) used for the production of the alkaline zirconia sol (A) as a raw material include an oxyzirconium salt, such as zirconium oxychloride and zirconium oxycarbonate. Particularly, zirconium oxycarbonate is preferably used.

A carbonate salt of quaternary ammonium is added to an aqueous medium to produce an alkali aqueous medium. At this time, when instead of a carbonate salt of quaternary ammonium, quaternary ammonium hydroxide is used, a satisfactorily stable zirconia sol cannot be obtained, but be obtained in a slurry in which two layers are separated. Further, for producing an alkali aqueous medium, when another alkali source, such as sodium hydroxide is used, also a stable hydrolyzed product of zirconium salt cannot be obtained, but only an unstable one is obtained and when such an unstable hydrolyzed product is subjected to a hydrothermal treatment, also a stable zirconia sol (A) cannot be obtained. However, it is possible to use another alkali source in combination with a carbonate salt of quaternary ammonium, such as water-soluble inorganic salts (for example, sodium hydroxide, potassium hydroxide, lithium hydroxide, and ammonia), amines (for example, n-propyl amine, monoethanol amine, and triethanol amine), water-soluble organic bases (for example, monomethyltriethyl ammonium hydroxide, and tetramethyl ammonium hydroxide), and carbonate salts other than a carbonate salt of quaternary ammonium (for example, ammonium carbonate). When an alkali substance is used in combination with a carbonate salt of quaternary ammonium, a mass ratio between a carbonate salt of quaternary ammonium and another alkali substance is preferably (a carbonate salt of quaternary ammonium):(another alkali substance)=1: 0.01 to 1.

The sub-process (i) for producing the alkaline zirconia sol (A) as a raw material is a process in which a zirconium salt is heated at 60 to 110° C. in an aqueous medium containing a carbonate salt of quaternary ammonium.

An aqueous medium used for the sub-process (i) for producing the alkaline zirconia sol (A) as a raw material, has pH of 9 to 12, and the content of a carbonate salt of quaternary ammonium in the aqueous medium is 10 to 35% by mass. The content of the zirconium salt as $ZrO_2$ in the aqueous medium is 5 to 20% by mass. When a heating temperature in the sub-process (i) is 60° C. or less, a satisfactory hydrolysis is not progressed, and even when the obtained hydrolyzed product is subjected to a hydrothermal treatment, a stable zirconia sol (A) cannot be obtained. On the other hand, when the heating temperature in the sub-process (i) is 110° C. or more, there is no aging time of the hydrolysis, which means that the reaction is transferred directly to a hydrothermal treatment and which is not preferred. The sub-process (i) is performed for usually 1 to 20 hours.

The sub-process (ii) for producing the alkaline zirconia sol (A) as a raw material is a process in which after the sub-process (i), a hydrothermal treatment is performed at 110 to 250° C. When performed at 110° C. or less, the hydrothermal treatment becomes unsatisfactory, and when performed at 250° C. or more, a large-scaled apparatus is required. The hydrothermal treatment is performed using an autoclave apparatus. The hydrothermal treatment of the sub-process (ii) is performed usually for 1 to 20 hours. Through the hydrothermal treatment, a hydrolyzed product of a zirconium salt is converted into zirconia particles. The zirconia particles obtained through the sub-process (ii) have a size ranging from 20 to 300 nm as observed with a transmission electron microscope.

A liquid through the sub-process (ii) is an alkali having pH of 8 to 12 and can be satisfactorily used as a zirconia sol (A) as it is. However, by performing a sub-process (iii) in which the liquid through the sub-process (ii) is cleaned with pure water using an ultrafiltration apparatus as an additional process, unnecessary salts can be removed, so that a high-purity alkaline zirconia sol (A) can be obtained.

An alkaline zirconia sol (A) through the sub-process (ii) has physical properties values, such as pH of 8 to 12, a specific surface area of 50 m²/g to 300 m²/g, a concentration of 30 to 60% by mass, an electric conductivity of 2000 to 10000 μS/cm and a viscosity of 1 to 30 mPa·s. Further, the particle diameter distribution thereof is in the range of 20 to 300 nm.

The alkaline zirconia sol (A) can stably exist under a condition of 50° C. for one month or more.

The alkaline zirconia sol (A) as a raw material may contain, if desired, an additive, such as water-soluble inorganic bases (for example, sodium hydroxide, potassium hydroxide, lithium hydroxide, and ammonia), amines (for example, n-propyl amine, monoethanol amine, and triethanol amine) and water-soluble organic bases (for example, monomethyltriethyl ammonium hydroxide, and tetramethyl ammonium hydroxide).

The alkaline zirconia sol (A) having pH ranging from 8 to 12 and a concentration ranging from 10 to 60% by mass can be used in the process (I) of the present invention.

In the process (I) for the production of the alkaline zirconia sol of the present invention, the basic zirconium carbonate salt (B1) is used as a basic zirconium carbonate salt solution.

In the process (I), the basic zirconium carbonate salt (B1) is used as an aqueous solution of ammonium zirconium carbonate ($(NH_4)_2[Zr(CO_3)_2(OH)_2]$), zirconium potassium carbonate ($K_2[Zr(CO_3)_2(OH)_2]$) or a mixture thereof in mixing with the alkaline zirconia sol (A). Among them, as the basic zirconium carbonate salt (B1), ammonium zirconium carbonate is preferred. Ammonium zirconium carbonate can also take the form of $(NH_4)_2[ZrO(CO_3)_2]$.

The basic zirconium carbonate salt aqueous solution having pH of 8 to 12 and a concentration of 1 to 30% by mass is used.

A method in which the basic zirconium carbonate salt (B1) is mixed in the state of an aqueous solution with the alkaline zirconia sol (A), is preferred. The concentration of the zirconium salt (B1) in the aqueous solution is preferably in a range of 1 to 30% by mass.

The process (I) of the present invention is a process in which an alkaline zirconia sol (A) and a basic zirconium carbonate salt (B1) are mixed in a mass ratio (Bs/As) ranging from 0.05 to 4.0 of a mass of a solid content (Bs) of the basic zirconium carbonate salt (B1) which is converted into an amount of $ZrO_2$ to a mass of a solid content (As) of the alkaline zirconia sol (A) which is converted into an amount of $ZrO_2$. The mixing of the alkaline zirconia sol (A) and the basic zirconium carbonate salt (B1) is performed in the process (I), however, a part of the basic zirconium carbonate salt (B1) may be added in the process (II).

In this case, throughout the processes (I) and (II), these two compounds may be mixed so that the mass ratio Bs/As becomes totally 0.05 to 4.0.

The mixing of the alkaline zirconia sol (A) and an aqueous solution of the basic zirconium carbonate salt (B1) is performed by a method of adding the alkaline zirconia sol (A) to a solution of the basic zirconium carbonate salt (B1), by a method of adding a solution of the basic zirconium carbonate salt (B1) to the alkaline zirconia sol (A), or by a method of mixing the two simultaneously.

When the mass ratio Bs/As is less than 0.05, the use amount of the alkaline zirconia sol (A) becomes too large. Thus, there is a concern that the production cost becomes high, and there is a probability that the binding properties of the two when used become unsatisfactory, On the other hand, when the mass ratio Bs/As is more than 4.0, the proportion of particles (b) having a particle diameter of less than 20 nm becomes large, so that the stability of the sol is lowered.

The process (II) of the present invention is a process in which the mixture obtained in the process (I) is aged at 20 to 100° C. The aging is performed more preferably by heating at 60 to 100° C. The aging is performed preferably for 0.5 to 12 hours.

The aging is performed for adjusting the size of colloidal particles formed by leaving the mixture to stand.

The pH of the alkaline zirconia sol obtained through the process (II) is 8 to 12.

Although zirconia particles of the alkaline zirconia sol (A) grow a little in an alkaline zirconia sol formed through the process (II), they are zirconia particles (a) having a particle diameter substantially within the range of 20 to 300 nm. With respect to the basic zirconium carbonate salt (B1), a part thereof is converted into zirconia particles (b) having a particle diameter in the range of less than 20 nm in an alkaline zirconia sol formed through the process (II), and the rest thereof is bonded to or coated on particles of the alkaline zirconia sol (A) as a raw material to be converted into zirconia particles (a). The particle diameter can be confirmed using a transmission electron microscope.

A part of the zirconia particles (b) in the alkaline zirconia sol is zirconia particles having a small particle diameter which can be confirmed using an electron microscope, and another part thereof which cannot be confirmed using an electron microscope is considered to be extremely fine colloids of zirconium oxide.

The zirconia particles (b) having a diameter of less than 20 nm contained in a liquid are zirconia particles having a small particle diameter, or extremely fine colloids of zirconium oxide which are difficult to be distinguished even by an electron microscope. However, in the case of a substance difficult to be distinguished even by an electron microscope, by evaporating to dryness a liquid in which the substance is contained, the substance can be confirmed to be zirconium oxide by a X-ray diffraction, so that the substance is considered to be extremely fine colloids of zirconium oxide.

A zirconia sol containing the zirconia particles (a) having a particle diameter ranging from 20 to 300 nm can individually stably exist. However, a zirconia sol containing the zirconia particles (b) having a particle diameter of less than 20 nm or extremely fine colloids of zirconium oxide are difficult to exist individually stably, and in a production process thereof, a gelation is likely to occur.

In the alkaline zirconia sol (A) used in the present invention, the surfaces of the zirconia particles are charged negatively in an alkali region. On the other hand, in the basic zirconium carbonate salt (B1), such as ammonium zirconium carbonate, a zirconium carbonate ion is charged negatively. For example, in the process (I) for mixing the alkaline zirconia sol (A) and the basic ammonium zirconium carbonate (B1), by mixing an aqueous ammonium zirconium carbonate solution and the alkaline zirconia sol, zirconia particles of the alkaline zirconia sol (A) and zirconium carbonate ions of the ammonium zirconium carbonate (B1) coexist stably both as negatively charged ions, and by aging the resultant mixture in the process (II), zirconia particles derived from the alkaline zirconia sol (A) and fine zirconia particles derived from basic ammonium zirconium carbonate (B1) are formed. A part of these fine zirconia particles is chemically bonded with the zirconia particles derived from the alkaline zirconia sol (A) by aging or heating, and by the amount of the fine particles bonded to or coated on the zirconia particles derived from the alkaline zirconia sol (A), the zirconia particles derived from the alkaline zirconia sol (A) grow as the particles. Another part of the fine zirconia particles becomes apart from the zirconia particles derived from the alkaline zirconia sol (A), and exists individually in the liquid or the fine zirconia particles are bonded to each other by aging or heating to grow as the particles.

According to the present invention, the obtained alkaline zirconia sol has a wider particle diameter distribution than that of the alkaline zirconia sol used as a raw material, and contains large particle zirconia, small particle zirconia, and zirconia extremely fine colloids. While an alkaline zirconia sol consisting of only small particle zirconia and zirconia extremely fine colloids has low stability, the alkaline zirconia sol according the present invention containing large particle zirconia, and small particle zirconia and zirconia extremely fine colloids which have been formed in the presence of the large particle zirconia has high stability.

By aging or heat-hydrolyzing the basic zirconium carbonate salt (B1) in the presence of the alkaline zirconia sol (A) as a raw material, the alkaline zirconia sol of the present invention containing the large zirconia particles (a) and the small zirconia particles (b) containing zirconia oxide extremely fine colloids can be obtained.

Even when the process (II) of the present invention is performed without using the alkaline zirconia sol (A) as a raw material and with using only an aqueous solution of the basic zirconium carbonate salt (B1), the eventual product is only a gel-shaped substance and a stable zirconia sol cannot be produced.

The pH of the alkaline zirconia sol can be lowered by adding an acidic substance, such as hydrochloric acid, nitric acid, and acetic acid as pH adjuster to convert the alkaline zirconia sol to an acidic zirconia sol, and also can be raised by adding an alkali substance, such as sodium hydroxide, ammonia, and quaternary ammonium.

EXAMPLES

Example 1

Into a 3 L glass-made vessel, 1306.1 g of an aqueous tetramethyl ammonium carbonate solution (manufactured by Tama Chemicals Co., Ltd; having a content of 44.5% by mass as tetramethyl ammonium hydroxide) and 592.2 g of pure water were charged to prepare a diluted aqueous solution. While stirring the prepared aqueous solution, thereinto 801.7 g of a total amount of zirconium oxycarbonate powder ($ZrOCO_3$; manufactured by Daiichi Kigenso Kagaku Kogyo Co., Ltd.; having a content of 42.1% by mass as $ZrO_2$) were gradually charged. After the completion of the charging, the resultant mixture was heated while stirring the mixture to 105° C., and while adding appropriately pure water to the mixture to control the concentration of the mixture, the mixture was aged at 105° C. for 6 hours. At the completion of the aging, the mixture was a slurry having a content of 12.5% by mass as $ZrO_2$ and pH of 10.7. The slurry was transferred into a stainless steel-made autoclave and was subjected to a hydrothermal synthesis reaction at 140° C. for 3 hours while stirring the slurry. The substance obtained after the reaction had no undissolved portion and was completely converted into a sol. The substance had a content of 12.5% by mass as $ZrO_2$ and pH of 10.0. Next, the sol was washed using an ultrafiltration apparatus while adding pure water gradually to the sol and was concentrated to thereby obtain 711 g of a high-concentration zirconia sol having a content of 42.7% by mass as $ZrO_2$. The obtained alkaline zirconia sol (A) had a specific gravity of 1.576, pH of 9.5, a viscosity of 5.5 mPa·s, a concentration of tetramethyl ammonium hydroxide (measured by a titration method) of 1.0% by mass, and a particle diameter of 77 nm as measured by a dynamic light scattering method. By the dynamic light scattering method, a particle diameter of particles in a sol is measured, and when the particles are aggregated with each other, an average particle diameter of the aggregated particles is measured. With a transmission electron microscope, particles were confirmed, and it was found that most of the particles were aggregated particles in which primary particles having a size of around 10 nm were aggregated with or bonded to each other and one aggregated particle had a size of 20 to 150 nm. Further, the zirconia sol had no sediment and was stable for one month or more under a condition of 50° C.

The alkaline zirconia sol (A) as a raw material was mixed with ammonium zirconium carbonate (process I).

Into a 3 L glass-made vessel, 1124.1 g of the alkaline zirconia sol (A) and 275.9 g of pure water were charged. While stirring the resultant solution, thereinto 600.0 g of a total amount of a basic ammonium zirconium carbonate solution (manufactured by Nippon Light Metal Co., Ltd) having a content of 20.0% by mass as $ZrO_2$ were gradually charged and after the completion of charging, the resultant mixture was stirred for 30 minutes to prepare a raw material mixture. The mixture had a content of 30.0% by mass as $ZrO_2$, a mass ratio (solid content ratio) of 4:1 of a mass of a solid content of the alkaline zirconia sol which is converted into an amount of $ZrO_2$ to a mass of a solid content of the basic ammonium zirconium carbonate which is converted into an amount of $ZrO_2$, and pH of 9.6 (process I). The raw material mixture was heated to 80° C. while stirring the mixture, and was further heated at 80° C. for one hour. The substance obtained after heating had no gel and was completely converted into a sol (process II). The obtained alkaline zirconia sol had a content of 30.0% by mass as $ZrO_2$, pH of 9.9, a B-type viscosity of 11.2 mPa·s, a total alkali amount (amount obtained by converting the total alkali amount capable of being measured by a titration method into an amount of $NH_3$) of 1.5% by mass, and a particle diameter of 121 nm as measured by a dynamic light scattering method. By the dynamic light scattering method, a particle diameter of particles in a sol is measured, and when the particles are aggregated with each other, an average particle diameter of the aggregated particles is measured. With a transmission electron microscope, particles were confirmed, and it was found that fine primary particles having a size of less than 20 nm which were present in substantially a mono-dispersing state and aggregated particles in which primary particles having a size of around 10 nm were aggregated with or bonded to each other coexisted. One aggregated particle had a size of 20 to 150 nm. Further, the zirconia sol had no sediment and was stable for one month or more under a condition of 50° C.

Example 2

Into a 3 L glass-made vessel, 1171.0 g of the alkaline zirconia sol (A) as a raw material prepared in substantially the same manner as in Example 1 and 79.0 g of pure water were charged. While stirring the resultant solution, thereinto 500.0 g of a total amount of a basic ammonium zirconium carbonate solution (manufactured by Nippon Light Metal Co., Ltd) having a content of 20.0% by mass as $ZrO_2$ were gradually charged and after the completion of charging, the resultant mixture was stirred for 30 minutes to prepare a raw material mixture. The prepared mixture had a content of 32.4% by mass as $ZrO_2$, a mass ratio (solid content ratio) of 5:1 of a mass of a solid content of the alkaline zirconia sol which is converted into an amount of $ZrO_2$ to a mass of a solid content of the basic ammonium zirconium carbonate which is converted into an amount of $ZrO_2$, and pH of 9.6 (process I). The raw material mixture was heated to 75° C. while stirring the mixture, and was further heated at 75° C. for one hour. The substance obtained after heating had no gel and was completely converted into a sol. Next, while maintaining the temperature at 75° C. and stirring the mixture, thereinto additionally 750.0 g of a total amount of a ammonium zirconium carbonate solution (manufactured by Nippon Light Metal Co., Ltd) having a content of 20.0% by mass as $ZrO_2$ were gradually charged and after the completion of charging, the resultant mixture was further heated at 75° C. for 30 minutes. The substance obtained after heating had a mass ratio (solid content ratio) of 2:1 of a mass of a solid content of the alkaline zirconia sol which is converted into an amount of $ZrO_2$ to a mass of a solid content of the basic ammonium zirconium carbonate which is converted into an amount of $ZrO_2$ 1 (process II). The alkaline zirconia sol obtained after heating had no gel and remained to be sol-like. The obtained alkaline zirconia sol had a content of 30.0% by mass as $ZrO_2$, pH of 9.6, a B-type viscosity of 11.6 mPa·s, a total alkali amount (amount obtained by converting the total alkali amount capable of being measured by a titration method into an amount of $NH_3$) of 3.0% by mass, and a particle diameter of 96 nm as measured by a dynamic light scattering method. By the dynamic light scattering method, a particle diameter of particles in a sol is measured, and when the particles are aggregated with each other, an average particle diameter of the aggregated particles is measured. With a transmission electron microscope, particles were confirmed, and it was found that fine primary particles having a size of less than 20 nm which was present in substantially a mono-dispersing state and aggregated particles in which primary particles having a size of around 10 nm were aggregated with or bonded to each other coexisted. One aggregated particle had a size of 20 to 150 nm. Further, the zirconia sol had no sediment and was stable for one month or more under a condition of 50° C.

Example 3

Into a 3 L glass-made vessel, 585.5 g of the alkaline zirconia sol (A) as a raw material prepared in substantially the same manner as in Example 1 and 664.5 g of pure water were charged. While stirring the resultant solution, thereinto 625.0 g of a total amount of a basic ammonium zirconium carbonate solution (manufactured by Nippon Light Metal Co., Ltd) having a content of 20.0% by mass as $ZrO_2$ were gradually charged and after the completion of charging, the resultant mixture was stirred for 30 minutes to prepare a raw material mixture. The prepared mixture had a content of 20.0% by mass as $ZrO_2$, a mass ratio (solid content ratio) of 2:1 of a mass of a solid content of the alkaline zirconia sol which is converted into an amount of $ZrO_2$ to a mass of a solid content of the basic ammonium zirconium carbonate which is converted into an amount of $ZrO_2$, and pH of 9.6 (process I). The raw material mixture was heated to 75° C. while stirring the mixture, and was further heated at 75° C. for one hour. The substance obtained after heating had no gel and was completely converted into a sol. Next, while maintaining the temperature at 75° C. and stirring the mixture, thereinto additionally 625.0 g of a total amount of a basic ammonium zirconium carbonate solution (manufactured by Nippon Light Metal Co., Ltd) having a content of 20.0% by mass as $ZrO_2$ were gradually charged and after the completion of charging, the resultant mixture was further heated at 75° C.

for one hour. The substance obtained after heating had a mass ratio (solid content ratio) of 1:1 of a mass of a solid content of the alkaline zirconia sol which is converted into an amount of $ZrO_2$ to a mass of a solid content of the basic ammonium zirconium carbonate which is converted into an amount of $ZrO_2$ (process II). The alkaline zirconia sol obtained after heating had no gel and remained to be sol-like. The obtained sol had a content of 20.0% by mass as $ZrO_2$, pH of 9.6, a B-type viscosity of 5.2 mPa·s, a total alkali amount (amount obtained by converting the total alkali amount capable of being measured by a titration method into an amount of $NH_3$) of 3.0% by mass, and a particle diameter of 95 nm as measured by a dynamic light scattering method. By the dynamic light scattering method, a particle diameter of particles in a sol is measured, and when the particles are aggregated with each other, an average particle diameter of the aggregated particles is measured. With a transmission electron microscope, particles were confirmed, and it was found that fine primary particles having a size of less than 20 nm which was present in substantially a mono-dispersing state and aggregated particles in which primary particles having a size of around 10 nm were aggregated with or bonded to each other coexisted. One aggregated particle had a size of 20 to 150 nm. Further, the zirconia sol had no sediment and was stable for one month or more under a condition of 50° C.

Comparative Example 1

Into a 3 L glass-made vessel, 258.5 g of the alkaline zirconia sol (A) as a raw material prepared in substantially the same manner as in Example 1 were charged. While stirring the solution, thereinto 2741.5 g of a total amount of a basic ammonium zirconium carbonate solution (manufactured by Nippon Light Metal Co., Ltd) having a content of 20.0% by mass as $ZrO_2$ were gradually charged and after the completion of charging, the resultant mixture was stirred for 30 minutes. The mixture had a content of 21.9% by mass as $ZrO_2$, a mass ratio (solid content ratio) of 1:5 of a mass of a solid content of the alkaline zirconia sol which is converted into an amount of $ZrO_2$ to a mass of a solid content of the basic ammonium zirconium carbonate which is converted into an amount of $ZrO_2$, and pH of 9.9. In the mixture, an agglomeration and cloudiness were caused and the appearance thereof was white and slurry-like. The mixture was heated to 80° C. while stirring the mixture, and was further heated at 80° C. for one hour. The substance obtained after heating became sol-like a little in comparison with the mixture before heating. However, in the mixture, fine zirconia particles were bonded to each other by heating, and as particle-growing, these particles were further aggregated, so that a lot of sedimentary gel was generated and the mixture was in an unstable state.

INDUSTRIAL APPLICABILITY

The zirconia sol obtained according to the present invention has a wide particle diameter distribution and is stable, so that by utilizing such properties, it can be applied in many applications, such as a binder for molding processing of various refractories, a binder for various catalysts, an impregnation treatment, a paint for coating, as well as molding processing of an inorganic fiber such as a ceramic fiber, shaping of a mold for a precision casting, a surface treatment of a fiber, and a fuel cell.

The invention claimed is:

1. A production method of an alkaline zirconia sol comprising:
    a process (I) in which an alkaline zirconia sol (A) is mixed with a basic zirconium carbonate salt (B1), the alkaline zirconia sol (A) being obtained by a method including:
    a sub-process (i) in which a zirconium salt (B2) is heated at 60 to 110° C. in an aqueous medium containing a carbonate salt of quaternary ammonium; and
    a sub-process (ii) in which a hydrothermal treatment is performed at 110 to 250° C. following the sub-process (i).

2. The production method of an alkaline zirconia sol according to claim 1 comprising:
    a process (I) in which an alkaline zirconia sol (A) and a basic zirconium carbonate salt (B1) are mixed in a mass ratio (Bs/As) ranging from 0.05 to 4.0 of a mass of a solid content (Bs) of the basic zirconium carbonate salt (B1) which is converted into an amount of $ZrO_2$ to a mass of a solid content (As) of the alkaline zirconia sol (A) which is converted into an amount of $ZrO_2$; and
    a process (II) in which the mixture obtained in the process (I) is aged at 20 to 100° C.

3. The production method of an alkaline zirconia sol according to claim 1, wherein the carbonate salt of quaternary ammonium is $(NR_4)_2CO_3$, $NR_4HCO_3$ or a mixture thereof (wherein, R represents a hydrocarbon group).

4. The production method of an alkaline zirconia sol according to claim 1, wherein quaternary ammonium ion in the carbonate salt of quaternary ammonium comprises a hydrocarbon group having 1 to 18 carbon atoms.

5. The production method of an alkaline zirconia sol according to claim 1, wherein quaternary ammonium ion in the carbonate salt of quaternary ammonium comprises a hydrocarbon group having 1 to 4 carbon atoms.

6. The production method of an alkaline zirconia sol according to claim 1, wherein the zirconium salt (B2) is an oxyzirconium salt.

7. The production method of an alkaline zirconia sol according to claim 1, wherein the zirconium salt (B2) is zirconium oxycarbonate.

8. The production method of an alkaline zirconia sol according to claim 1, wherein the basic zirconium carbonate salt (B1) is ammonium zirconium carbonate.

9. The production method of an alkaline zirconia sol according to claim 2, wherein the aging in the process (II) is performed by heating at 60 to 100° C.

10. The production method of an alkaline zirconia sol according to claim 1, wherein the obtained alkaline zirconia sol has pH of 8 to 12.

* * * * *